(12) United States Patent
Chen

(10) Patent No.: US 6,439,012 B1
(45) Date of Patent: Aug. 27, 2002

(54) NON-SKID DUAL LEG AUTOMOBILE PEDAL LOCKING DEVICE

(76) Inventor: Dennis Quiang Chen, 62-54 97th Pl., Apt. 16A, Rego Park, NY (US) 11374

( * ) Notice: Subject to any disclaimer, the term of this patent is extended or adjusted under 35 U.S.C. 154(b) by 51 days.

(21) Appl. No.: 09/675,370

(22) Filed: Sep. 29, 2000

(51) Int. Cl.[7] ............................................... B60R 25/08
(52) U.S. Cl. ............................. 70/202; 70/201; 70/237
(58) Field of Search ..................... 70/198–203, 237, 70/238

(56) References Cited

U.S. PATENT DOCUMENTS

| 4,779,435 A | | 10/1988 | Farrow |
| D312,200 S | | 11/1990 | Bhaqwat |
| 5,094,092 A | | 3/1992 | Hsieh |
| 5,359,868 A | | 11/1994 | Villani |
| 5,537,846 A | * | 7/1996 | Simon ........................... 70/202 |
| 5,713,229 A | * | 2/1998 | Garcia et al. .................. 70/209 |
| 5,906,121 A | | 5/1999 | Mankarious |
| 5,911,765 A | * | 6/1999 | DaSilva ........................ 70/202 |
| 5,950,463 A | * | 9/1999 | Glazier et al. ................ 70/202 |
| 5,979,197 A | | 11/1999 | Mellini et al. |
| 6,006,559 A | * | 12/1999 | Hsu ............................... 70/202 |
| 6,029,483 A | | 2/2000 | Daniels |
| 6,089,055 A | * | 7/2000 | Vito ............................ 780/202 |

* cited by examiner

Primary Examiner—Kathy Matecki
Assistant Examiner—William S. Fee
(74) Attorney, Agent, or Firm—Randal D. Homburg

(57) ABSTRACT

The invention is a non-slip, dual leg pedal lock for securing one or more pedals and pedal arms of an automobile to prevent the theft of the automobile, the pedal lock a pair of dual leg shaft components, a locking slide bar component, a pedal engaging component and a keyed lock which engages both of the dual leg shaft components for double security locking the pedal to the floor of an automobile in a non-slip attachment to the vehicle floor.

6 Claims, 5 Drawing Sheets

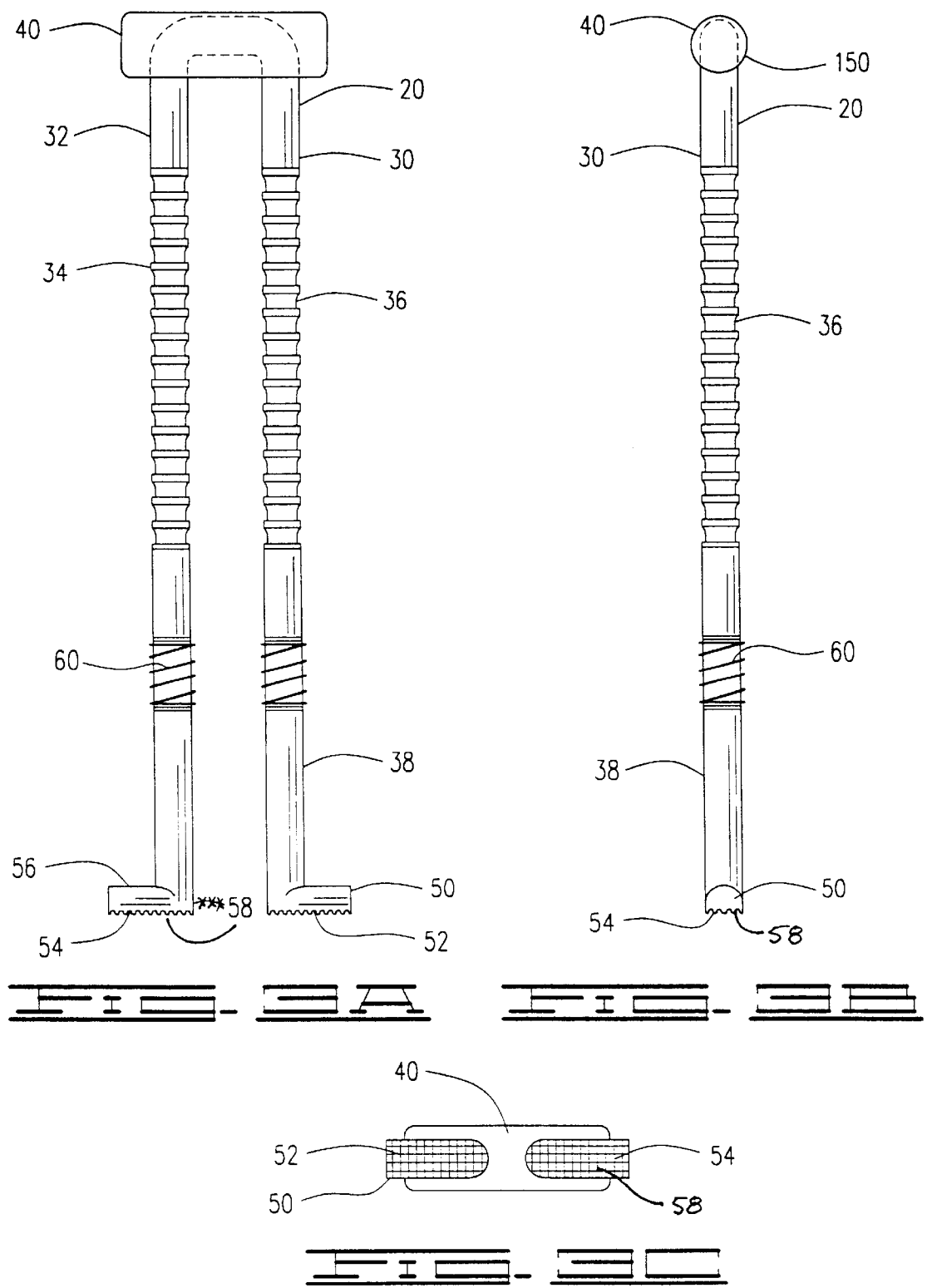

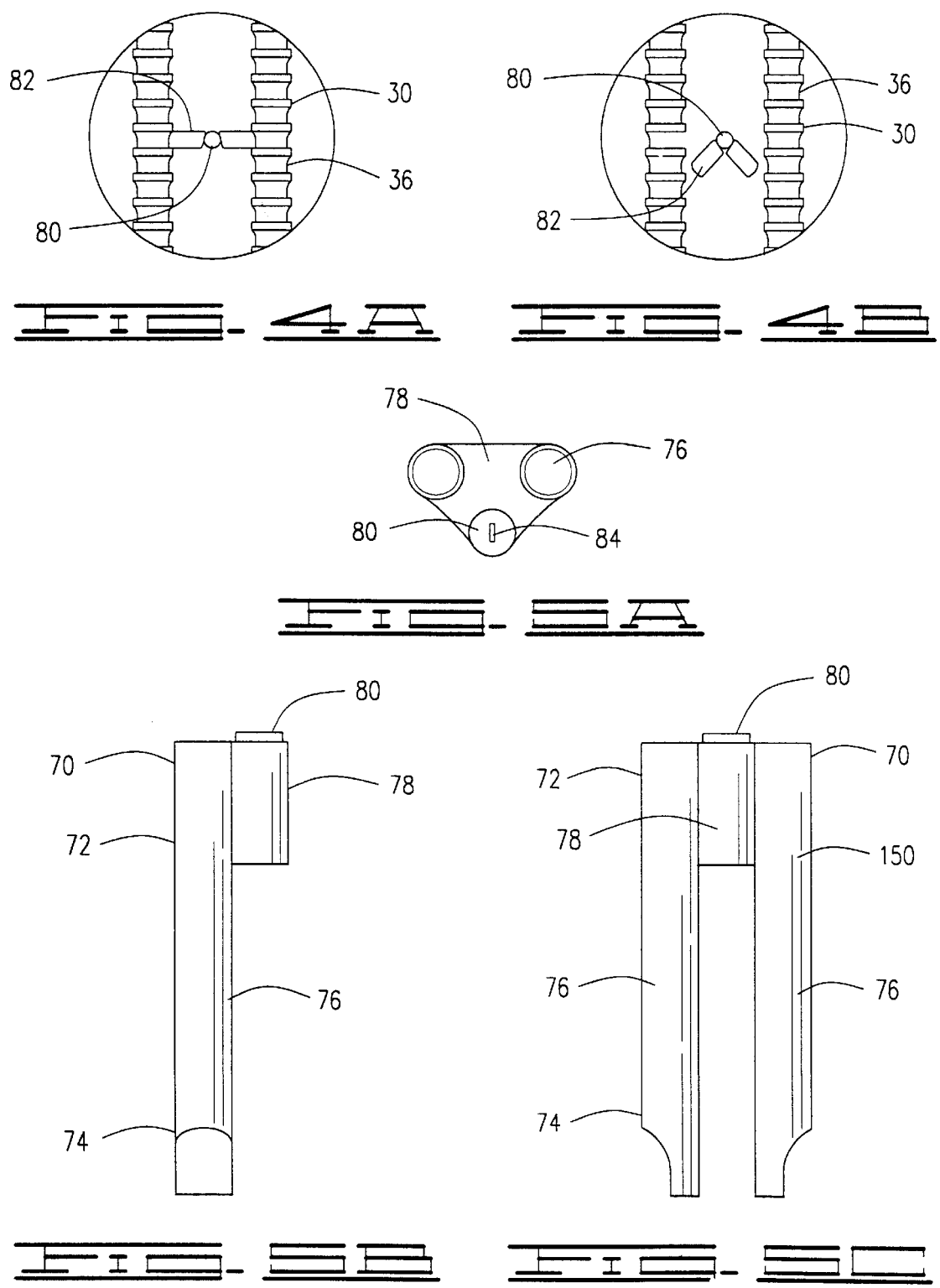

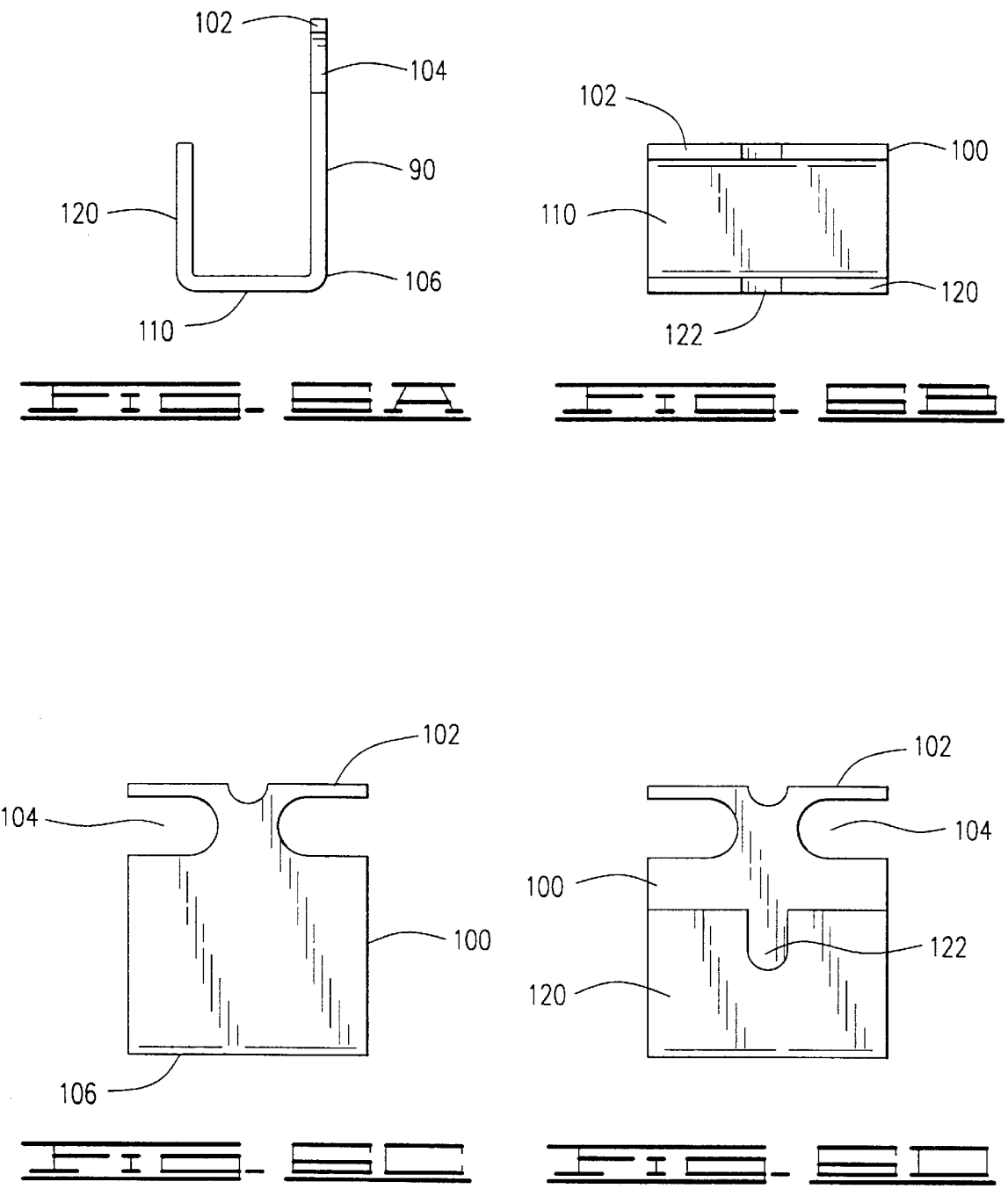

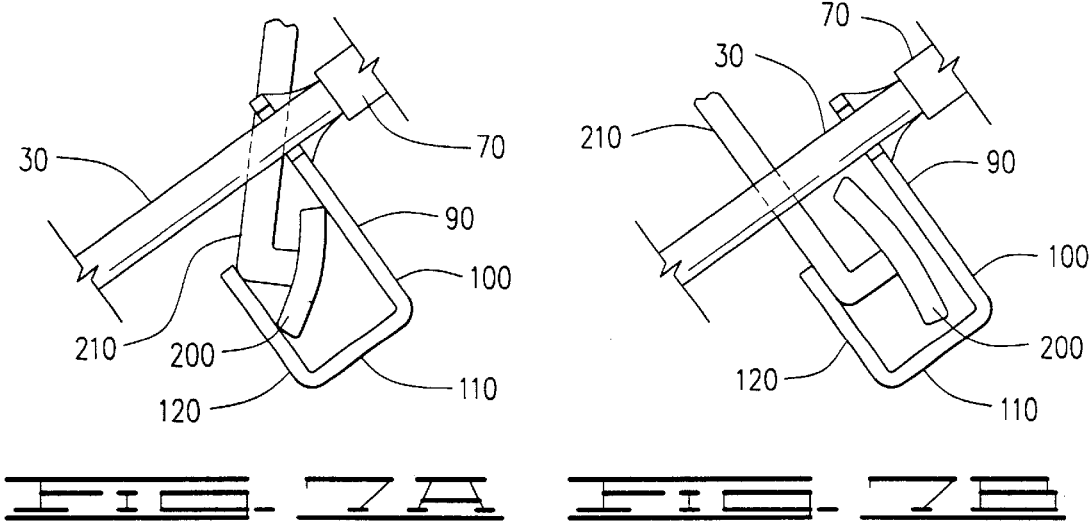
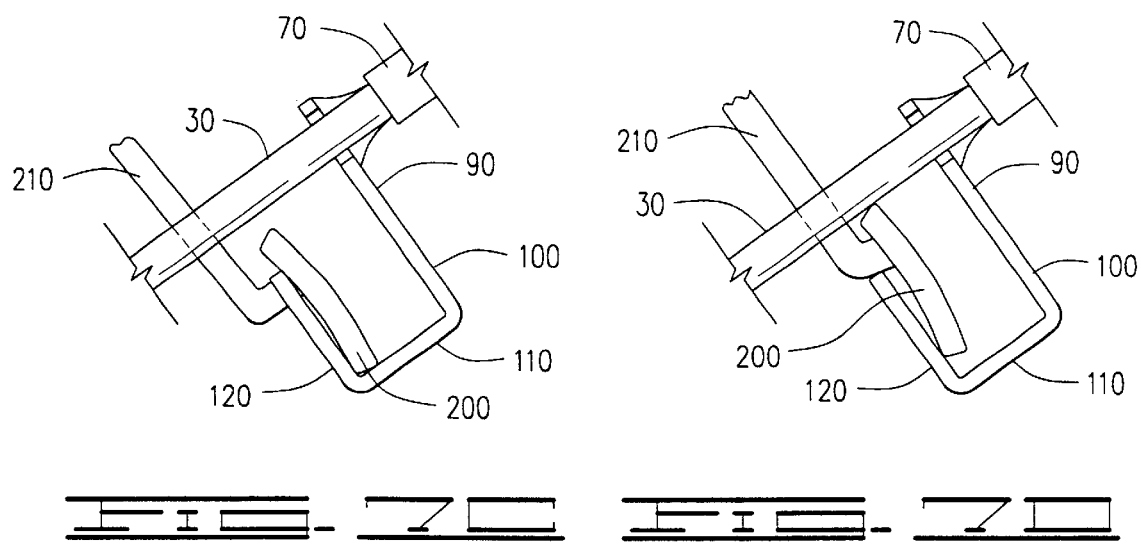

NON-SKID DUAL LEG AUTOMOBILE
PEDAL LOCKING DEVICE

CROSS REFERENCE TO RELATED APPLICATIONS

None.

I. BACKGROUND OF THE INVENTION

1. Field of Invention

The invention is a non-slip, dual leg pedal lock for securing the brake pedal of an automobile to prevent theft, the invention having a locking means on the dual legs for double secure locking of the device.

2. Description of Prior Art

The following United States patents are disclosed herein and incorporated into this application for utility patent. All relate to automobile anti-theft devices. In U.S. Pat. No. 5,979,197, a shaft and a lower movable plate are disclosed having a second movable component locking the lever arm of an automobile pedal is disclosed, the invention multiple pedal engaging embodiments and a lock means engaging a singular shaft. A similar patent, disclosed in U.S. Pat. No. 5,906,121 to Mankarious, defines a locking anti-theft device attaching to a pedal arm and the pedal having an extending shaft extending to the floor of the automobile as an extension of the pedal arm, the device first attaching to the pedal arm, being slid under the pedal and then extended with a key lock holding the extending shaft in place, causing the user to have to bend over to apply the device to the pedal.

Two patents, U.S. Pat. No. 6,029,483 to Daniels and U.S. Pat. No. 4,779,435, disclose locking devices attaching to steering wheels and a pedal to secure a vehicle from theft. In U.S. Pat. No. D312,200 to Bhagwat and U.S. Pat. No. 5,094,092 to Hsieh, multiple pedal locks are disclosed, locking the entire pedal bank of an automobile within a relatively flat device preventing the pedals from movement towards the automobile floor. A gear shift and gas pedal lock device is disclosed in U.S. Pat. No. 5,359,868 to Villani.

None of these patents disclose a dual leg member having non-slip means on the bottom of each leg, nor do they disclose locking means activating two locking pawls engaging each of the legs of the dual leg member. The non-slip means of the bottom of each legs prevents the device from being moved once planted into the floor of the automobile, which is apparent in pedal locking devices which do not have non-slip means, the non-slip means engaging the floor materials covering of the automobile floor. The dual legs prevent rocking of the device once attached to the automobile pedal which is apparent in single leg pedal locks.

II. SUMMARY OF THE INVENTION

The primary objective of the invention is to provide a non-slip automobile pedal lock device which cannot be slid or moved once applied to the automobile. A second objective is to provide a dual leg element which prevents rocking of the device once applied and also provides two legs engaged by the locking means of the invention which is biased in opposing directions improving over locking means engaging a single leg.

III. DESCRIPTION OF THE DRAWINGS

The following drawings are submitted with this utility patent application.

FIGS. 3a–3c are a front, side and bottom view of the dual leg shaft component with the non-slip means on the bottom each leg.

FIG. 4a is a view of the locking means in the engaged position while FIG. 4b is a view of the locking means in the disengaged position.

Figure 1:
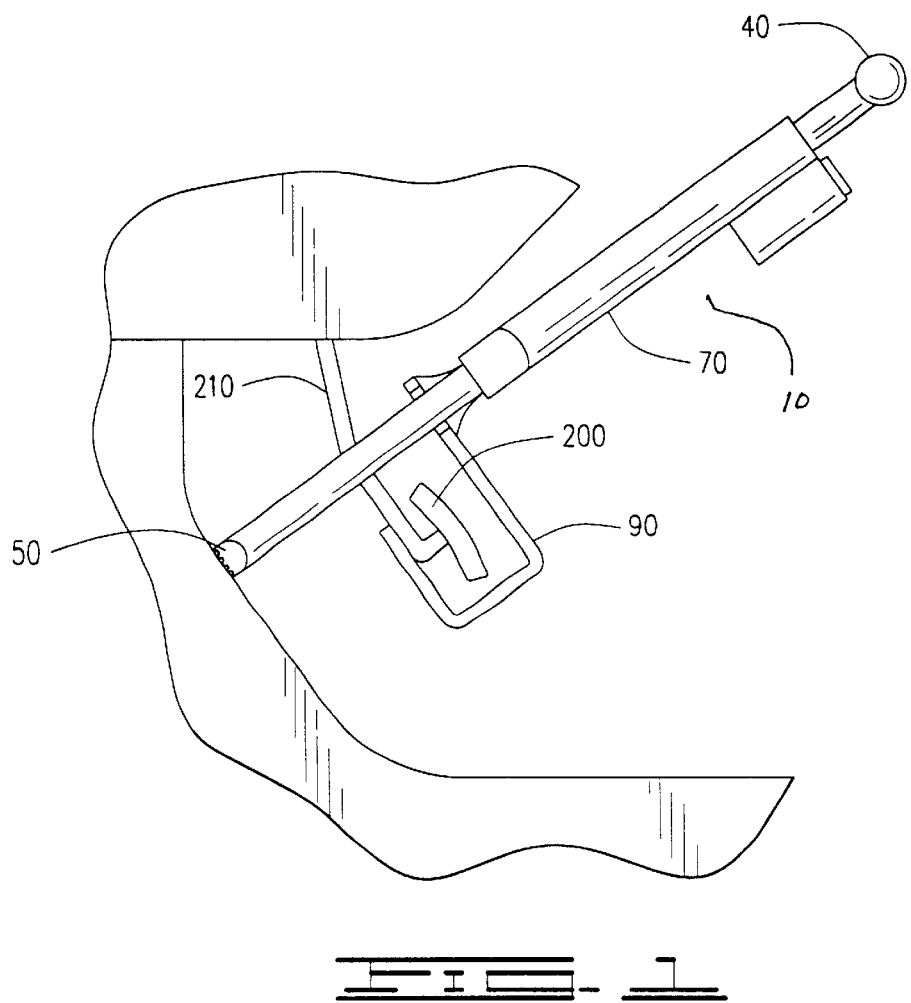
FIG. 1 is side view of the invention engaging an automobile pedal.

FIGS. 5a, 5b, and 5c are respective side, top and front views of the locking slide bar component of the invention.

FIGS. 6a–6c are top, bottom and side views of the pedal engaging component of the invention.

FIGS. 7a–7c are views of the pedal engaging component engaging a variety of different automobile pedals.

IV. DESCRIPTION OF THE PREFERRED EMBODIMENT

The invention is a non-slip, dual leg pedal lock device 10 for securing one or more pedal 200 and pedal arms 210 of an automobile to prevent theft of the automobile, the invention comprising a dual leg shaft component 20 and a locking slide bar component 70 with an attached pedal engaging component 90.

Figure 2:
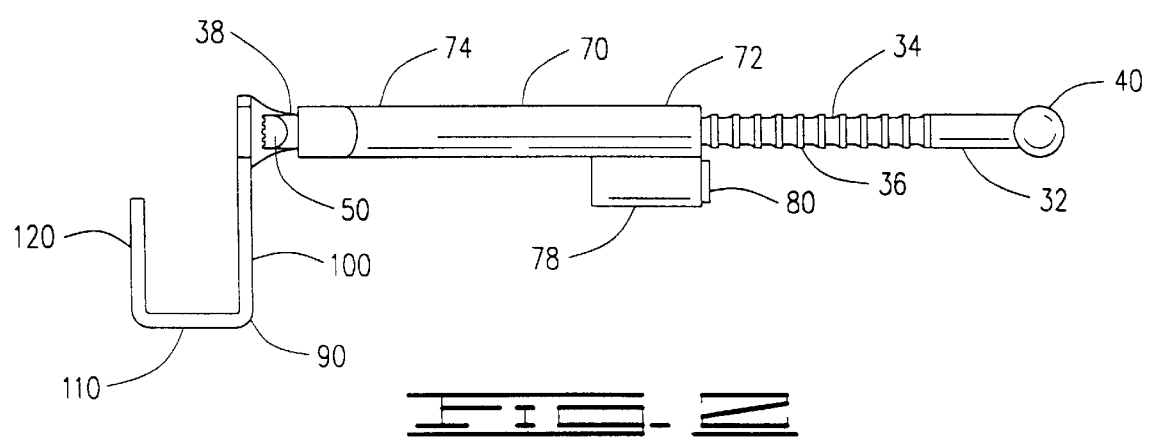
FIG. 2 is a side view of the invention in a retracted position.

The dual leg shaft component 20, as shown in FIGS. 1–4b of the drawings, is a pair of parallel metal shafts 30 having a top portion 32, a middle portion 34 and a bottom portion 38, the top portion 32 of each of the metal shafts 30 being connected by a handle bar 40. The middle portion 34 of each metal shaft 30 is supplied with a plurality of grooved indentations 36. The bottom portion 38 of each metal shaft 30 is connected to a flat foot plate 50, the foot plate 50 having a non-slip means 52, an upper surface 56 and a bottom surface 58. This non-slip means 52, located on the bottom surface 58 of the foot plate 50, in a preferred embodiment, may be a plurality of teeth 54 which engage the carpet or flooring backing material of the automobile. A cylindrical spring 60 may be located on each metal shaft 30 between the plurality of grooved indentations 36 and the foot plate 36 in one embodiment of the invention. The pair of parallel metal shafts 30, with the upper surface 56 of each foot plate 50 attached to the bottom portion 38 of each metal shaft 30, are spaced apart to allow the metal shafts 30 to straddle the pedal arm 210 of the pedal 200 to which the invention 10 is to be applied and to allow for the passage of the pedal arm 210 between the two metal shafts 30 when applying the invention 10 to the pedal 200.

The locking slide bar component 70 of the invention, as shown in FIGS. 1, 2, 5a and 5b of the drawings, has an upper portion 72, a lower portion 74 and includes a pair of parallel hollow cylindrical tubes 76 connected together by a yoke 78 which contains a shaft locking means 80. The metal shafts 30 of the dual leg shaft component 20 are slidably engaged within the pair of hollow cylindrical tubes 76. The locking slide bar component 70 is applied to the dual leg shaft component 20 prior to the affixation of the foot plates 50 to the bottom portion 38 of each metal shaft 30.

The shaft locking means 80, as shown in FIGS. 4a–5b of the drawings, is located at the upper portion 72 of the locking slide bar component 70 within the yoke 78 and lockingly engages the plurality of grooved indentations 36 on the middle portion 34 of the metal shafts 30. In a preferred embodiment, the shaft locking means 80 includes a pair of biased pawls 82 which rotate by a key 84. These pair of biased pawls 82 engage opposing grooved indentations 36 on the two metal shafts 30 when the shaft locking means 80 in this preferred embodiment is engaged to lock the locking slide bar component 70 to the dual leg shaft component 20 at a desired extension. To disengage the shaft locking means 80 of this embodiment, the key 84 is rotated releasing the pair of biased pawls 82 from the opposing grooved indentations 36 allowing the locking slide bar component 70 to slide along the dual leg shaft component 20.

Attaching to the lower portion 74 of the locking slide bar component 70 is the pedal engaging component 90, as shown in FIGS. 1, 2, 6a–c and 7a–c of the drawings. This pedal engaging component 90 is preferably C-shaped and formed of heavy reinforced metal. The pedal engaging component 90 has an upper plate 100, an end plate 110 and a lower plate 120. The upper plate 100 has a pair of anchor wings 102, a pair of opposing leg slots 104 and a front edge 106. The anchor wings 102 of the upper plate 100 are welded to the lower portion 74 of the locking slide bar component 70 affixing the upper plate 100 of the pedal engaging component 90 in perpendicular relationship with the lower portion 74 of the locking slide bar components 70. The end plate 110 descends perpendicular from the front edge 106 of the upper plate 100 and the lower plate 120 extends perpendicular from the end plate 110 and parallel to the upper plate 100. The lower plate 120 is provided with a pedal arm slot 122 which allows the lower plate 120 to capture the pedal arm 210 of the pedal 200 while the pedal engaging component 90 captures the entire pedal 200 to which the invention 10 is to be attached, the pedal 200 confined within the upper plate 100, the end plate 110 and the lower plate 120.

The opposing leg slots 104 in the upper plate 100 of the pedal engaging component 90 allow for the passage of the two metal shafts 30 in the dual leg shaft component 20 without restriction or interruption. The pedal arm slot 122, when the invention 10 is being assembled, is aligned between the two metal shafts 30 of the dual leg shaft component 20. After assembly, the pedal engaging component 90 is attached to the locking slide bar component 70 and the dual leg shaft component 20 is slidably engaged with the locking slide bar component 50, with the metal shafts 30 extending through the opposing leg slots 104 in the pedal engaging component 90. The cylindrical springs 60, included in one embodiment of the invention, separate the upper surface 56 of the foot plates 50 on the bottom portion 38 of the metal shafts 30 from the lower portion 74 of the locking slide bar component 70.

To attach the invention to a pedal 200 of an automobile, the shaft locking means 80 must be disengaged. The locking slide bar component 70 is slid to the bottom portion 38 of the metal shafts 30 of the dual leg shaft component 20. The pedal arm 210 of the pedal 200 to which the invention 10 is installed is placed between the bottom portion 38 of the two metal shafts 30 and the pedal 200 is situated within the pedal engaging component 90. The user then takes hold of the handle bar 40 on the dual leg shaft component 20 and the locking slide bar component 70 and urges the locking slide bar component 70 towards the handle bar 40, forcing the foot plates 50 on the lower portion 38 of the metal shafts 30 securely against the floor of the automobile, forcing the non-slip means 52 into the flooring material on the floor of the automobile. The shaft locking means 80 is then engaged and the dual leg shaft component 20 and the locking slide bar components 70 are securely locked together, preventing the pedal 200 and pedal arm 210 captured in the pedal engaging component 90 from being moved in an upward, downward or sideways movement once affixed to the pedal and pedal arm.

In a preferred embodiment, the shaft locking means 80 is provided wherein the locking slide bar component 70 may be moved towards the handle bar 40 of the invention without the need to engage or disengage the shaft locking means 80, but the shaft locking means 80 would be required to be disengaged in order for the locking slide bar component 70 to be move away from the handle bar 40 of the dual leg shaft component 20, providing for keyless application of the invention 10 to secure the invention 10 to the automobile pedal 200 and pedal arm 210. The invention 10 may also included exterior foam padding 150 covering the locking slide bar component 70 and the handle bar 40 to pad the areas where the user's hands would be located for installation of the invention 10 onto the pedal 200.

While the invention has been particularly shown and described with reference to a preferred embodiment thereof, it will be understood by those skilled in the art that changes in form and detail may be made therein without departing from the spirit and scope of the invention.

What is claimed is:

1. A non-slip, dual leg pedal lock for securing a pedal and a pedal arm of an automobile to prevent theft, the pedal lock comprising:

a. a dual leg shaft component having a pair of parallel metal shafts, each of the metal shaft having a top portion, a middle portion including a plurality of grooved indentations, and a bottom portion, a handle bar connecting the top portion of each of the metal shaft;

b. a pair of foot plates having an upper surface and a lower surface, the upper surface attached to the bottom portion of each of the metal shaft and the lower surface provided with a non-slip means;

c. a locking slide bar component comprising a pair of hollow cylindrical tubes connected by a yoke containing a shaft locking means, the locking slide bar component having an upper portion and a lower portion, the hollow cylindrical tubes slidably engaging the two metal shafts; and d. a pedal engaging component attached to the lower portion of the locking slide bar component, the pedal engaging component including an upper plate having anchor wings attaching to the lower portion of the locking slide bar component, opposing leg slots and a front edge, an end plate perpendicularly descending from the front edge of the upper plate, and a lower plate having a pedal arm slot, the lower plate bending perpendicularly inward from the end plate, parallel and below the upper plate, with the metal shafts passing through the leg slots of the upper plate, wherein the pedal engaging component is affixed to the pedal and the pedal arm of the automobile, the locking slide bar component is pulled towards the handle bar, and the shaft locking means within the yoke of the locking slide bar component engages the plurality of grooved indentations in the metal shafts, locking the locking slide bar component to the dual leg shaft component preventing upward, downward or sideways movement of the invention affixed to the pedal and pedal arm.

2. The pedal lock, as disclosed in claim 1, wherein the shaft locking means includes a pair of biased pawls which rotate by a key, the pair of biased pawls engaging opposing grooved indentations on the two metal shafts when the shaft locking means is locked.

3. The pedal lock as disclosed in claim 1 wherein the non-slip means is a plurality of teeth which engage the carpet or flooring backing material of the automobile.

4. The pedal lock, as disclosed in claim 1, wherein the lower plate, being provided with a pedal arm slot, allows the lower plate to capture the pedal arm of the pedal while the pedal engaging component captures the entire pedal to which the invention is to be attached, the pedal confined within the upper plate, the end plate and the lower plate, the opposing leg slots in the upper plate of the pedal engaging component allow for the passage of the two metal shafts in the dual leg shaft component without restriction or interruption, and the pedal arm slot, when the invention is being assembled, is aligned between the two metal shafts of the dual leg shaft component.

5. The pedal lock, as disclosed in claim 1, the shaft locking means provided wherein the locking slide bar component may be moved towards the handle bar without the need to engage or disengage the shaft locking means, but the shaft locking means would be required to be disengaged in order for the locking slide bar component to be move away from the handle bar of the dual leg shaft component.

6. A method of securing the pedal lock, as disclosed in claim 1, to the pedal and pedal arm of the automobile, the method comprising:

a. disengaging the shaft locking means;

b. sliding the locking slide bar component to the bottom portion of the metal shafts of the dual leg shaft component;

c. placing the pedal arm of the pedal to which the invention is installed between the bottom portion of the two metal shafts and placing the pedal within the pedal engaging component;

d. urging the locking slide bar component towards the handle bar, forcing the foot plates on the lower portion of the metal shafts securely against a floor of the automobile, forcing the non-slip means into a flooring material on the floor of the automobile;

e. activating the shaft locking means, locking the dual leg shaft component and the locking slide bar components securely together, preventing the pedal and pedal arm captured in the pedal engaging component from being moved in an upward, downward or sideways movement once affixed to the pedal and pedal arm.

* * * * *